United States Patent [19]

Bauer et al.

[11] Patent Number: 5,449,499
[45] Date of Patent: Sep. 12, 1995

[54] APPARATUS FOR DEFLECTING A FLOW OF FLUID, SUCH AS GAS OR FLUE GAS, WHICH MAY LEAD TO A DENOX CATALYTIC CONVERTER

[75] Inventors: Heinrich Bauer, Erlangen; Gerhard Berner, Hessdorf, both of Germany

[73] Assignee: Siemens Aktiengesellschaft, Munich, Germany

[21] Appl. No.: 202,280

[22] Filed: Feb. 24, 1994

[30] Foreign Application Priority Data

Feb. 24, 1993 [DE] Germany .................. 43 05 665.2
Dec. 17, 1993 [DE] Germany .................. 43 43 287.5

[51] Int. Cl.6 .................................................. B01D 53/00
[52] U.S. Cl. ........................... 422/176; 422/177; 422/217; 422/220
[58] Field of Search ........... 422/177, 176, 217, 220; 138/37, 39, 42; 55/465

[56] References Cited

U.S. PATENT DOCUMENTS

| | | | |
|---|---|---|---|
| 3,291,205 | 12/1966 | Harris et al. | 55/465 |
| 3,351,091 | 11/1967 | Chambert | 138/39 |
| 3,650,292 | 3/1972 | Platz et al. | 138/39 |
| 3,831,350 | 8/1974 | Gilles et al. | 138/37 |
| 5,043,146 | 8/1991 | Ishikawa et al. | 422/176 |

FOREIGN PATENT DOCUMENTS

| | | |
|---|---|---|
| 919657 | 9/1954 | Germany . |
| 1008068 | 5/1957 | Germany . |
| 1188563 | 3/1965 | Germany . |
| 3923134 | 11/1991 | Germany . |
| 1516767 | 7/1978 | United Kingdom . |
| 2247744 | 8/1991 | United Kingdom . |

Primary Examiner—Timothy M. McMahon
Attorney, Agent, or Firm—Herbert L. Lerner; Laurence A. Greenberg

[57] ABSTRACT

An apparatus for deflecting a flow of a fluid from an inflow conduit, through a deflection zone and into at least one outlet conduit having an axis and being bent by a deflection angle relative to the inflow conduit, includes components being disposed in the deflection zone and largely avoiding a flow through an adjacent two of the components. Each of the components has a main axis forming an acute angle with the axis of the outflow conduit, is elongated along the main axis, has a first end facing toward the outflow conduit and a second end opposite to the first end, along the main axis, and protrudes into the deflection zone with the first end. The fluid may be a gas, such as flue gas and a deNO$_x$ catalytic converter may be disposed downstream of the outflow conduit.

15 Claims, 3 Drawing Sheets

APPARATUS FOR DEFLECTING A FLOW OF FLUID, SUCH AS GAS OR FLUE GAS, WHICH MAY LEAD TO A DENOX CATALYTIC CONVERTER

BACKGROUND OF THE INVENTION

FIELD OF THE INVENTION

The invention relates to an apparatus for deflecting the flow of a fluid, such as a gas or a flue gas from an inflow conduit, through a deflection zone and into an outflow conduit that is angled relative to the inflow conduit by a deflection angle, and possibly into a deNO$_x$ catalytic converter.

In many industrial fields there is a need for deflecting the flow of a fluid. The fluid flows from an inflow conduit through a deflection zone into an outflow conduit that is bent at an angle relative to the inflow conduit. Reverse-flow zones, eddies and turbulence can develop in the deflection zone with the creation and dimension thereof depending on various physical variables, in particular the flow velocity in the inflow conduit, the density and viscosity of the fluid, and the geometry of the inflow conduit, the deflection zone and the outflow conduit. Among other effects, that causes the flow of fluid to lose energy, and upon entry of the fluid into the outflow conduit, the flow has an uneven velocity profile.

In process technology, there is often a requirement to deflect a flow of a gas from an inflow conduit into an outflow conduit, and the cross-sectional area of the inflow conduit may be smaller than that of the outflow conduit. The flow of the gas should already have a uniform flow profile soon after entering the outflow conduit. That is of special significance, for instance, for supplying a flow of gas containing dust to an electrostatic dust separator, or upon the inflow of combustion air into a zoned grate for the sake of uniform combustion of coal, and in a conventional power plant for an oncoming flow against a deNO$_x$ catalytic converter, where stringent demands are placed on the flow of flue gas in terms of its flow profile.

For the sake of meeting the requirements for the flow profile, depending on the fluid-technology application, provision is made, for instance in conventional power plants where there is an oncoming flow against deNO$_x$ catalytic converters, to provide guide vanes, typically in the deflection zone, between which the fluid flows and is deflected in the process. The guide vanes are constructed in accordance with operating conditions, in particular the geometry of the conduit and the physical characteristic variables of the fluid, such as the Reynolds number, the viscosity and the density. In order to provide for their construction, either comprehensive and possibly parameter studies must be made, or recourse to information in the literature is necessary. Due to the special geometry of the guide vanes, they are expensive to produce and sometimes require special manufacturing processes and relatively major consumption in terms of materials. The securing of the guide vanes must be adapted to the applicable operating conditions and must be constructed for the forces (buoyancy) and moments that occur in each case. Furthermore, retrofitting of guide vanes into existing conduits with deflection zones may be extremely difficult.

Solid particles, particularly dust particles, entrained in the flow are deposited primarily on negative-pressure sides of the guide vanes. A danger exists of relatively large quantities of solid particles that have accumulated at the guide vanes slipping from them and getting into the outflow conduit. That can cause damage to devices that are disposed in or downstream of the outflow conduit, and particularly can cause plugging up of catalytic converters.

German Patent DE 39 23 134 C2 describes an apparatus for deflecting a flow from a first conduit into at least one second conduit which is disposed at an angle relative to the first conduit, with a transitional region between the two conduits. Baffles that are essentially parallel and are spaced apart by the same distance from one another and form lanes are disposed in the transitional region. In the axial direction of the first conduit, they progressively increasingly protrude from the second conduit into the transition region. The baffles are rotated relative to the axis of the first conduit by an acute angle, in other words an angle of less than 90°. The total flow is split into partial flows that are carried through the lanes of the apparatus. The baffles are flat and on a downstream edge each has at least one segment protruding from the plane of the baffle. The segment forms an acute or right angle with the baffle and thus brings about the development of an eddy zone within and downstream of the respective lane and a flow backup at the end of each lane. As a result of the eddy zones, flowing down and evening out of the flow is intended to be obtained in the second conduit. The eddy zones in the lanes and the partial currents flowing through the lanes are in a state of mass transfer with one another, and as a result solid particles entrained in the partial flows reach the eddy and backup zones and can accumulate there. As a result of an accumulation or deposit of large quantities of particles, the danger exists in that apparatus as well that relatively large quantities of solid particles entrained in the flow will suddenly reach the second conduit.

SUMMARY OF THE INVENTION

It is accordingly an object of the invention to provide an apparatus for deflecting a flow of a fluid, such as a gas or a flue gas from an inflow conduit into an outflow conduit which is angled relative to the inflow conduit, and which may lead to a deNO$_x$ catalytic converter, which overcomes the hereinafore-mentioned disadvantages of the heretofore-known devices of this general type, in which the flow has a uniform velocity profile shortly after entering the outflow conduit, which is simple and economical to produce and wherein it is possible to install the apparatus retroactively in a simple and economical way. Moreover, the apparatus should avoid an accumulation of solid particles entrained in the flow.

With the foregoing and other objects in view there is provided, in accordance with the invention, in an apparatus for deflecting a flow of a fluid from an inflow conduit, through a deflection zone and into at least one outlet conduit having an axis and being bent by a deflection angle relative to the inflow conduit, the improvement comprising components being disposed in the deflection zone and largely avoiding or averting a flow through an adjacent two of the components, each of the components having a main axis forming a respective acute angle with the axis of the outflow conduit; being elongated along the main axis; having a first end facing toward the outflow conduit and a second end opposite to the first end, along the main axis; and protruding into the deflection zone with the first end.

A deflection of the flow is effected with the apparatus of the invention in such a way that each component is elongated or extended along its main axis to the first end protruding into the deflection zone, and a flow through two adjacent components is largely averted. This is effected, for instance, by providing that an opening formed by the second ends of each of the components is largely mechanically closed, for instance by a plate or by part of a conduit limiting wall, or is located in a flow region that is only slightly affected by the flow, such as a backwater zone or a reverse-flow region. The components can be disposed in the deflection zone retroactively as well in a simple manner and with little effort, so that the apparatus can be produced simply and economically. Moreover, the apparatus can easily be adapted to changed conditions, such as a changed flow velocity, fluid temperature, or the use of a different fluid, by changing the type, number and/or alignment of the components.

In accordance with another feature of the invention, the second end of each component borders on a conduit limiting wall that is angled relative to the axis of the outflow conduit. The second end may, for instance, be joined to the conduit limiting wall in a material-locking fashion, either directly or through a sealing material, thereby reliably averting a flow through two adjacent components. Spacing the second end apart from the conduit limiting wall in such a way that a flow can be admitted at least at some points is also possible and is essentially advantageous for the sake of free thermal expansion of the component. For any technologically relevant geometric construction of the conduit limiting wall, it is possible for the second end to border on the conduit limiting wall. The conduit limiting wall may also be a flow partition disposed in the deflection zone, for splitting up the flow in the case where there are two or more outflow conduits.

Due to the simple, economical production and installation of the components, the apparatus for deflecting the flow of a fluid is not bound to special conduit geometries either, and in particular special deflection angles or special conduit cross-sections, such as rectangular or circular cross sections.

In accordance with a further feature of the invention, the deflection angle is between approximately 30° and approximately 135°. Particularly at a deflection angle of approximately 90°, the flow in the outflow conduit can be especially favorably effected because there is great flexibility in constructing the apparatus.

Since the flow course is generally parallel to the axis of the inflow conduit upstream of the deflection zone, and it should be generally parallel to the axis of the outflow conduit downstream of the deflection zone, the components are preferably disposed in such a way that the main axis of each component forms an acute angle with the axis of the outflow conduit.

In accordance with an added feature of the invention, the acute angle between the main axis of a component and the axis of the outflow conduit is advantageously in the range of up to approximately 60° and in particular below approximately 45°. This makes it possible to lend the flow a flow direction that has a course which is generally parallel to the axis of the outflow conduit, even in the deflection zone.

The possibility of relatively large quantities of solid particles becoming detached from the deflection device is even further reduced if the components are disposed with their respective main axis approximately parallel to the axis of the outflow conduit, or in other words if the acute angle amounts to approximately 0°. This disposition of the components is moreover very simple to produce and set up, and it can be adapted simply and economically to changing flow conditions.

A required flow profile in the outflow conduit can be attained in particular by a suitable selection of the form of the components, the mutual spacings of the components, and the disposition of the first end in the deflection zone. It is especially advantageous to place the first ends along a monotonic curve in the deflection zone. The deflection zone merges into the inflow conduit at a first cross-sectional plane that is at right angles to an axis of the inflow conduit, and it merges into the outflow conduit at second cross-sectional plane which is at right angles to an axis of the outflow conduit. Preferably, the greater the distance between a first end and the first cross-sectional plane, the smaller the distance of the same first end from the second cross-sectional plane. In any case, few eddies and separation zones and little turbulence arise in the deflection zone, so that even at the beginning of the outflow conduit, with only slight pressure loss, the flow already is given a uniform flow profile, which is required, for instance, when there is an oncoming flow against a $deNO_x$ catalytic converter.

In accordance with an additional feature of the invention, the monotonic curve has a linear or parabolic profile, and as a result a uniform transition for the flow from the inflow conduit to the outflow conduit is achieved. Other profiles are also possible, particularly profiles especially adapted to the particular fluid-technology requirements of a given case.

In accordance with yet another feature of the invention, simple and in particular approximately flat components are used, such as flat sheets. The term "sheet" is intended in this case to mean not only metal components but also components of other materials, such as ceramic, plastic or glass. Such components are very simple to produce and can also be secured in the deflection zone very simply, even retroactively. They can easily be adapted to any technologically relevant geometry of the deflection zone. They furthermore have the advantage of not permitting major quantities of solid particles entrained in the flow to remain stuck to their surface. The accumulation and sudden detachment of major quantities of solid particles that could reach the outflow conduit is thus avoided. Such events could in particular damage a catalytic converter downstream of the outflow conduit.

In accordance with yet a further feature of the invention, the components have smooth surfaces, so that then the likelihood that solid particles entrained in the fluid will accumulate on the components and from there possibly reach the outflow conduit suddenly in major quantities, is reduced even further.

Joining of the second end of each component to the wall is carried out while taking into account the particular materials being used for the components and for the wall.

In accordance with yet an added feature of the invention, the connection in the case of metal components and a metal wall is done by welding or soldering or may in general be a screw-type or plug-in-type connection. The connection is preferably simple to produce, even with retroactive installation of the components. The connection is mechanically stable, so that the forces and moments transmitted by the flow onto the connection will be absorbed. The components may be adapted economically and stably to any technologically relevant geometry of the deflection zone.

In accordance with yet an additional feature of the invention, the apparatus is suitable for deflecting the flow of a gas from an inflow conduit, through a deflection zone, into at least one outflow conduit. Solid particles entrained in the flow of gas accumulate on the components in slight quantities, if at all, so that the danger of a major quantity of solid particles sliding off into the outflow conduit is largely averted. Damage to flow components disposed in or downstream of the outflow conduit, such as catalytic converters, is thus averted.

In accordance with a concomitant feature of the invention, the flow of a gas, in particle a flue gas, is deflected in such a way that a requisite flow profile is already present in the outflow conduit shortly after the flow enters the outflow conduit, as is often required in the case of an oncoming flow against a deNO$_x$ catalytic converter.

Other features which are considered as characteristic for the invention are set forth in the appended claims.

Although the invention is illustrated and described herein as embodied in an apparatus for deflecting a flow of a fluid, such as a gas or a flue gas, which may lead to a deNO$_x$ catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
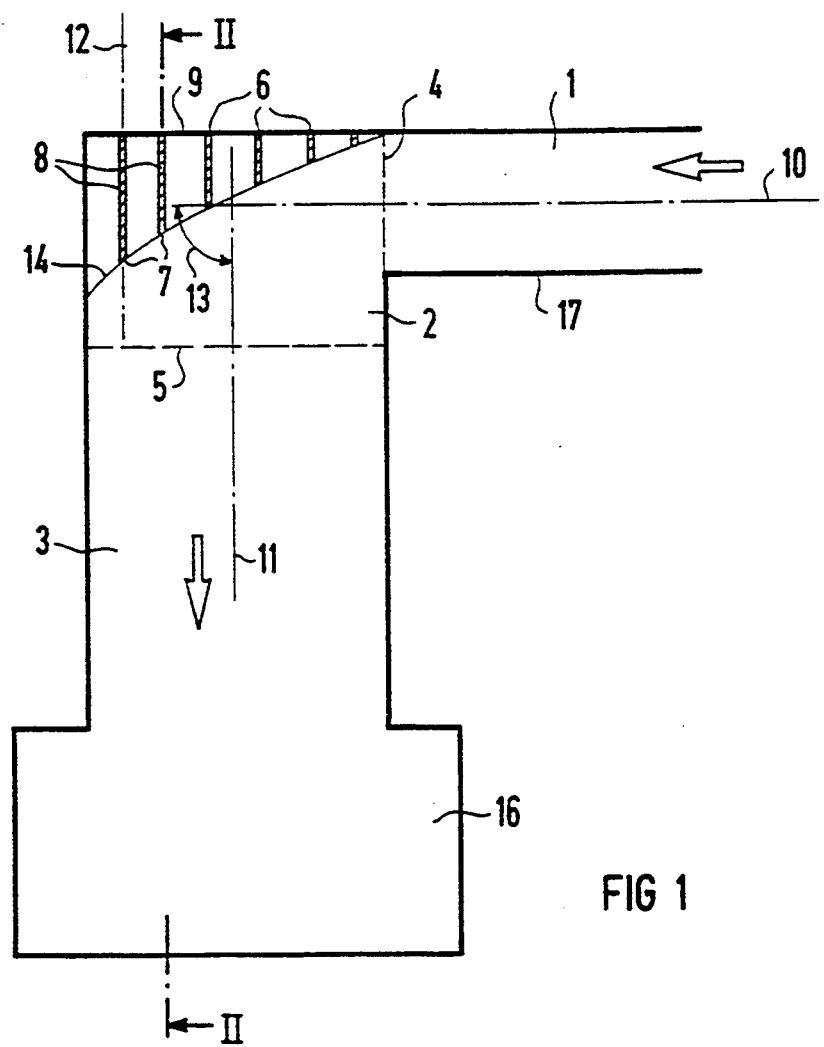
FIG. 1 is a sectional view of a first embodiment of the invention which is taken along a plane defined by one inflow conduit and one outflow conduit.
Figure 3:
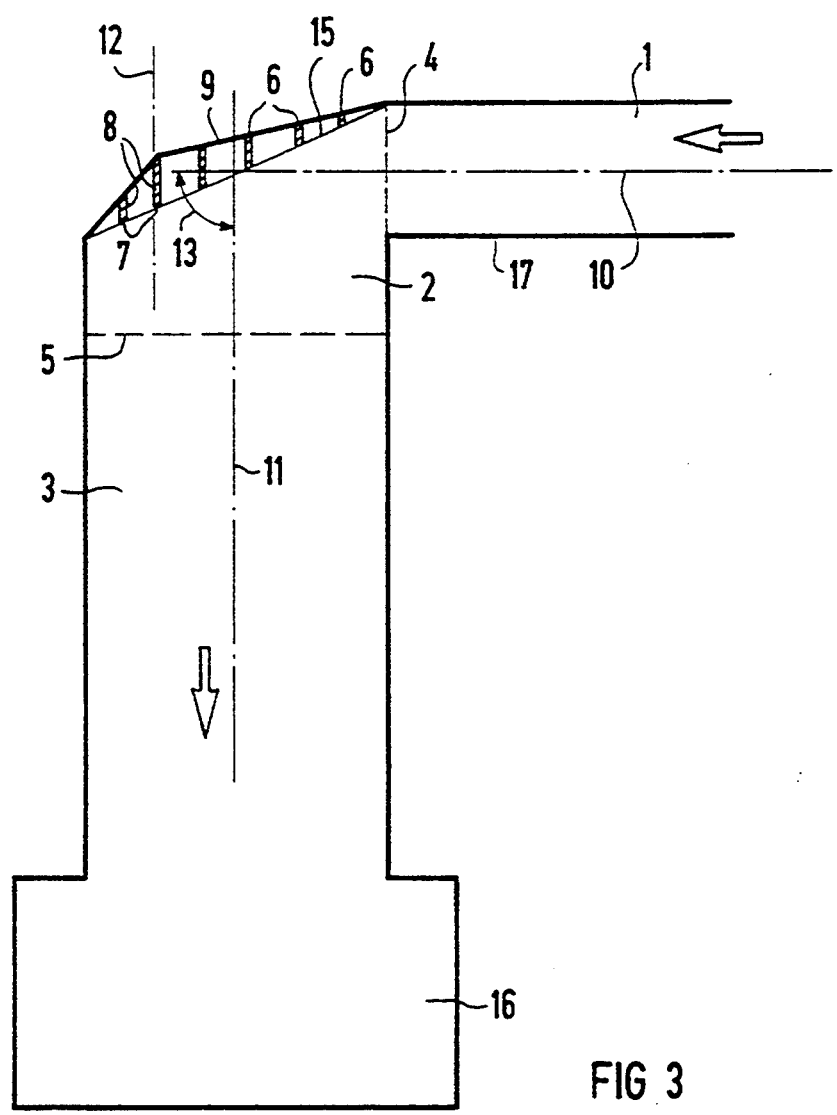
FIG. 3 is a sectional view of a second embodiment, which is taken along a plane defined by one inflow conduit and one outflow conduit.
Figure 4:
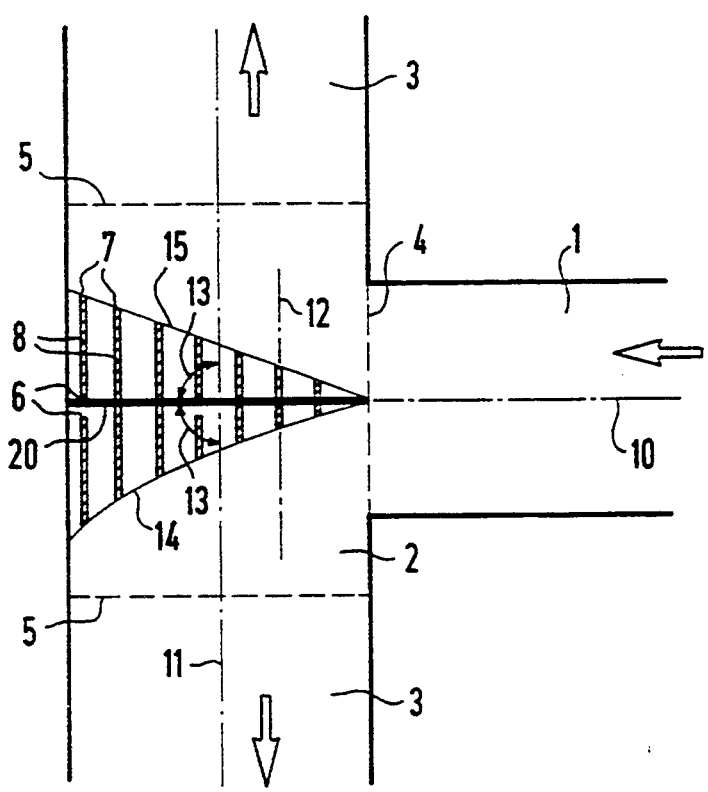
FIG. 4 is a sectional view of a third embodiment, which is taken along a plane defined by one inflow conduit and two outflow conduits.

Referring now to the figures of the drawing in detail and first, particularly, to FIGS. 1, 3 and 4 thereof, it is seen that in those embodiments a gas flows from the right in each case, parallel to an axis 10 of a rectangular inflow conduit 1, through a first cross-sectional plane 4 that is at right angles to the axis 10 of the inflow conduit 1, and into a deflection zone 2. The flow of the gas is deflected in the deflection zone 2 by a deflection angle 13 of 90° and flows out, through a second cross-sectional plane 5, into at least one likewise rectangular outflow conduit 3, parallel to an axis 11 thereof. The outflow conduit 3 has a cross section which is larger than that of the inflow conduit 1. The cross-sectional plane 5 is at right angles to the axis 11 of the outflow conduit 3.

In the first embodiment of FIG. 1, flat components 8, namely plates with smooth surfaces, are disposed parallel to one another and have first ends 7 and second ends 6. In the deflection zone 2, the second ends 6 are firmly joined to a conduit limiting wall 9 that is angled relative to the axis 11 of the flow conduit 3, such as by being welded to it. Each component 8 is extended along its main axis 12 toward the outflow conduit 3, from the first end 7 to the second end 6. The main axis 12 of each component 8 extends parallel to the axis 11 of the outflow conduit 3. An acute angle between the main axis 12 and the axis 11 of the outflow conduit 3 is 0° in this case. As a result, solid particles entrained in the flow of the gas accumulate at most in slight quantities on the components 8, and there is no danger that major quantities of solid particles will suddenly slide into the outflow conduit 3 and reach a deNO$_x$ catalytic converter 16 disposed downstream of the outflow conduit 3. In order to deflect the flow of the gas, the first ends 7 of the components 8 are disposed in such a way that they are located on a parabolic curve 14. The configuration is made in such a way that the spacing from the first ends 7 to the first cross-sectional plane 4 becomes greater as the distance from the first ends 7 to the second cross-sectional plane 5 becomes shorter. The parabolic curve 14 is thus curved toward the outflow conduit 3. With this configuration of the components 8 in the deflection zone 2, a desired flow profile for the oncoming flow to the deNO$_x$ catalytic converter 16 is essentially achieved even shortly after the entrance of the flow into the outflow conduit 3, and in particular at the second cross-sectional plane 5.

Figure 2:
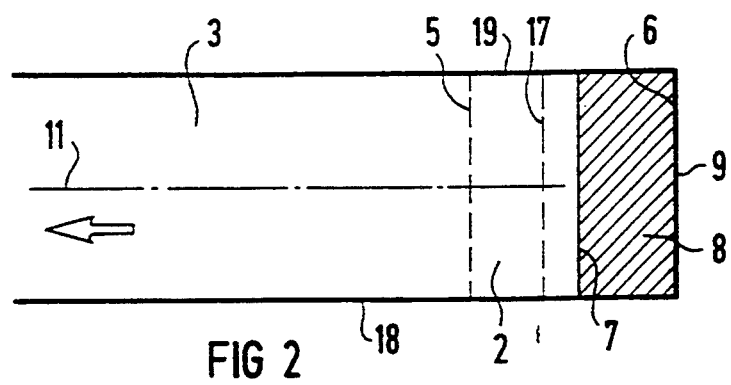
FIG. 2 is a sectional view of the first embodiment which is taken along a plane II—II extending parallel to a cross-sectional plane of the inflow conduit.

FIG. 2 shows a section through the apparatus of FIG. 1 at right angles to the plane defined by the inflow conduit 1 and the outflow conduit 3. Both the second cross-sectional plane 5 and a lengthening of a conduit limiting wall 17 (seen in FIG. 1 as well) of the inflow conduit 1 are shown. Each component 8 fills the entire height of the deflection or turnaround zone 2. The first end 7 of each component 8 protrudes parallel to the axis 11 of the outflow conduit 3 into the deflection zone 2 and is oriented toward the outflow conduit 3. The second end 6 of each component 8 borders the conduit limiting wall 9 and is firmly joined to it. Fastening the component 8 to an upper conduit limiting wall 19 and to a lower conduit limiting wall 18 is also possible.

FIG. 3 shows the second embodiment of the invention, which matches the embodiment of FIG. 1 except for the geometry of the conduit limiting wall 9 in the deflection zone 2 and a disposition of the ends 7 of the components 8 along a straight line 15. The conduit limiting wall 9 is angled relative to the axis 10 of the inflow conduit 1. In the case where the geometry of the conduit limiting wall 9 is more complicated, a deflection of the flow from the inflow conduit 1 into the outflow conduit 3 with a uniform flow profile is attained with this apparatus for deflecting the flow as well at the cross-sectional plane 5 of the outflow conduit 3.

FIG. 4 shows the third embodiment of the apparatus, in which a flow of a gas takes place from an inflow conduit 1 into two outflow conduits 3 having the same axis 11. The angle of deflection 13 between the axis 10 of the inflow conduit 1 and the axis 11 of each outflow conduit 3 is 90°. In other words, the axis 11 of each outflow conduit 3 is perpendicular to the axis 10 of the inflow conduit 1. An angle other than 90° between the axis 11 and the axis 10 is likewise possible. Two different deflection angles 13 may also occur for the deflection of the flow into the two outflow conduits 3. In the deflection zone 2, a conduit limiting wall 20, which splits the deflection zone 2 into two regions, is disposed parallel to the axis 10 of the inflow conduit 1. The components 8 disposed in the deflection zone 2 are flat plates each having a smooth surface. The main axis 12 of each component 8 extends parallel to the axis 11 of the outflow conduit 3, so that the acute angle is 0°. Each component 8 is extended along its main axis 12, borders on the conduit limiting wall 20 with its second end 6 and protrudes into the deflection zone 2 with its first end 7. Securing of the components 8 in the deflection zone 2 is achieved by means of a fixed connection of the second ends 6 to the conduit limiting wall 20 or a fixed connection to the conduit limiting walls 18, 19 (seen in FIG. 2) extending parallel to the plane defined by the inflow conduit 1 and the outflow conduit 3. In the case of fastening to the conduit limiting walls 18, 19 (seen in FIG. 2), a free space for expansion may remain between the second end 6 and the conduit limiting wall 20. This free space for expansion may be especially advantageous to compensate for temperature expansions. Placing the components 8 in the deflection zone 2 without the conduit limiting wall 20 is also possible. In that case, both the first end 7 and the second end 6, which oppose one another along the main axis 12, each protrude into one deflection zone 2. Since the acute angle between the main axis 12 of each component 8 and the axis 11 of the outflow conduit 3 is 0°, accumulation of solid particles, such as dust particles, entrained in the flow of the gas, is largely averted. There is thus essentially no danger that a major quantity of solid particles will suddenly slip from the components 8 into one of the outflow conduits 3.

An apparatus according to the invention for deflecting the flow can be produced very simply and economically and can also be retroactively installed simply and economically. It can be used for any technologically relevant conduit geometry, because of the great flexibility in construction of the apparatus. A use of the apparatus for deflecting a gas that flows into a deNO$_x$ catalytic converter after deflection is especially suitable.

We claim:

1. In an apparatus for deflecting a flow of a fluid from an inflow conduit, through a deflection zone and into at least one outlet conduit having an axis and being bent by a deflection angle relative to the inflow conduit, the improvement comprising a plurality of components being disposed in the deflection zone and preventing a throughflow between an adjacent two of said components, each of said components:

a) having a main axis forming an acute angle with the axis of the outflow conduit;
b) being elongated along said main axis;
c) having a first end facing toward the outflow conduit and a second end opposite to said first end, along said main axis; and
d) protruding into the deflection zone with said first end.

2. The apparatus according to claim 1, including a conduit limiting wall being angled relative to the axis of the outflow conduit, said second end of each of said components bordering on said conduit limiting wall.

3. The apparatus according to claim 1, wherein said deflection angle is between 30° and 135°.

4. The apparatus according to claim 1, wherein said deflection angle is approximately 90°.

5. The apparatus according to claim 1, wherein said acute angle between said main axis of each of said components and the axis of the outflow conduit is at most 60°.

6. The apparatus according to claim 1, wherein said acute angle between said main axis of each of said components and the axis of the outflow conduit is less than 45°.

7. The apparatus according to claim 1, wherein said acute angle between said main axis of each of said components and the axis of the outflow conduit is 0°.

8. The apparatus according to claim 1, wherein the inflow conduit has an axis, a first cross-sectional plane is perpendicular to the axis of the inflow conduit, a second cross-sectional plane is perpendicular to the axis of the outflow conduit, and said first ends of said components are disposed along a monotonic curve with a spacing between said first ends and said first cross-sectional plane being increased as a spacing between said free ends and said second cross-sectional plane is decreased.

9. The apparatus according to claim 8, wherein said curve is linear.

10. The apparatus according to claim 8, wherein said curve is parabolic.

11. The apparatus according to claim 1, wherein each of said components is substantially flat.

12. The apparatus according to claim 1, wherein said components have smooth surfaces for reducing a likelihood that solid particles entrained in the fluid accumulate on the components.

13. The apparatus according to claim 1, including a conduit limiting wall, each of said components being secured to said conduit limiting wall.

14. The apparatus according to claim 13, wherein each of said components is welded to said conduit limiting wall.

15. The apparatus according to claim 13, wherein said second end of each of said components is secured to said conduit limiting wall.

* * * * *